US008266337B2

(12) United States Patent
Madruga et al.

(10) Patent No.: US 8,266,337 B2
(45) Date of Patent: Sep. 11, 2012

(54) DYNAMIC LOGICAL DATA CHANNEL ASSIGNMENT USING CHANNEL BITMAP

(75) Inventors: Joaquin Madruga, Round Rock, TX (US); Dean J. Burdick, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 11/951,435

(22) Filed: Dec. 6, 2007

(65) Prior Publication Data
US 2009/0150576 A1 Jun. 11, 2009

(51) Int. Cl.
*G06F 13/28* (2006.01)
(52) U.S. Cl. ............... 710/22; 710/23; 710/24; 710/26; 710/27; 710/28
(58) Field of Classification Search .............. 710/22
See application file for complete search history.

(56) References Cited

U.S. PATENT DOCUMENTS

| | | | |
|---|---|---|---|
| 3,760,371 A * | 9/1973 | Pitroda et al. ............. 714/797 |
| 5,115,425 A * | 5/1992 | Ardon ..................... 370/217 |
| 5,502,838 A | 3/1996 | Kikinis |
| 5,530,932 A | 6/1996 | Carmean et al. |
| 5,669,003 A | 9/1997 | Carmean et al. |
| 5,732,215 A | 3/1998 | Boutaghou et al. |
| 5,809,314 A | 9/1998 | Carmean et al. |
| 6,330,251 B1 * | 12/2001 | O'Loughlin et al. ......... 370/476 |
| 6,738,675 B2 | 5/2004 | Dai |
| 6,826,656 B2 | 11/2004 | Augsburg et al. |
| 7,043,405 B2 | 5/2006 | Orenstien et al. |
| 7,305,499 B2 * | 12/2007 | Furuta et al. ............. 710/22 |
| 7,870,337 B2 | 1/2011 | Bell, Jr. et al. |
| 2003/0158697 A1 | 8/2003 | Gold et al. |
| 2003/0182540 A1 * | 9/2003 | Burky et al. ............. 712/225 |
| 2003/0236815 A1 | 12/2003 | Brenner et al. |
| 2006/0130062 A1 | 6/2006 | Burdick et al. |
| 2006/0288151 A1 | 12/2006 | McKenney |
| 2006/0289862 A1 | 12/2006 | Yoshida et al. |
| 2007/0079216 A1 | 4/2007 | Bell, Jr. et al. |
| 2007/0162651 A1 * | 7/2007 | Gwilt et al. ............. 710/22 |
| 2008/0288123 A1 | 11/2008 | Krishnan et al. |

OTHER PUBLICATIONS

Vaidyanathan Srinivasan, "Cell Broadband Engine DMA engines, Part 1," Dec. 6, 2005, p. 1-11.*
WhatIs.com, "What is Register", Sep. 21, 2005 http://whatis.techtarget.com/definition/0,,sid9_gci212882,00.html.*

(Continued)

*Primary Examiner* — Chun-Kuan Lee
*Assistant Examiner* — Dayton Lewis-Taylor
(74) *Attorney, Agent, or Firm* — Hamilton & Terrile, LLP; Michael Rocco Cannatti (57) ABSTRACT

A method, system and program are provided for dynamically allocating DMA channel identifiers by virtualizing DMA transfer requests into available DMA channel identifiers using a channel bitmap listing of available DMA channels to select and set an allocated DMA channel identifier. Once an input value associated with the DMA transfer request is mapped to the selected DMA channel identifier, the DMA transfer is performed using the selected DMA channel identifier, which is then deallocated in the channel bitmap upon completion of the DMA transfer. When there is a request to wait for completion of the data transfer, the same input value is used with the mapping to wait on the appropriate logical channel. With this method, all available logical channels can be utilized with reduced instances of false-sharing.

20 Claims, 3 Drawing Sheets

OTHER PUBLICATIONS

J. Stokes, ars technica, Introducing the IBM/Sony/Toshiba Cell Processor—Part I: the SIMD processing units, http://arstechnica.com/articles/paedia/cpu/cell-1.ars/1, published Feb. 7, 2005.
J. Stokes, ars technica, Introducing the IBM/Sony/Toshiba Cell Processor—Part I: the SIMD processing units, http://arstechnica.com/articles/paedia/cpu/cell-1.ars/2, published Feb. 7, 2005.
J. Stokes, ars technica, Introducing the IBM/Sony/Toshiba Cell Processor—Part II: the Cell Architecture, http://arstechnica.com/articles/paedia/cpu/cell-2.ars, published Feb. 8, 2005.
IBM, Cell Broadband Engine Programming Handbook, Version 1.1, Apr. 24, 2007; (Attempts to upload the document were unsuccessful due to its encryption, so the link is provided below) http://www-01.ibm.com/chips/techlib/techlib.nsf/techdocs/9F820A5FFA3ECE8C8725716A0062585F/$file/CBE__Handbook_v1.1__24APR2007__pub.pdf.
Patterson, David A., Lecture 18: Snooping vs. Directory Based Coherency, 1996.

* cited by examiner

| effective address | channel bitmap position |
|---|---|
| a | ... 000 |
| b | ... 001 |
| c | ... 010 |
| d | |

DYNAMIC LOGICAL DATA CHANNEL ASSIGNMENT USING CHANNEL BITMAP

BACKGROUND OF THE INVENTION

1. Field of the Invention

The present invention is directed in general to the field of data processing systems. In one aspect, the present invention relates to direct memory access management within data processing systems.

2. Description of the Related Art

Data processing systems typically include one or more central processing units (CPU), one or more levels of caches, one or more external memory devices, and input/output (I/O) mechanisms, all interconnected via an interconnection of buses and bridges. In addition to these hardware components, data processing systems also include one or more software (or firmware) components, such as an Operating System (OS) and one or more programs which interact with the OS. To facilitate memory access operations, direct memory access (DMA) operations are used to provide data transfer operations (e.g., from external memory to a local cache memory) without requiring direct processor oversight and control. Typically, a hardware DMA controller is provided for a processor which allows multiple DMA requests to be made on different logical channels. These channels can be used independently to initiate multiple simultaneous asynchronous DMA data transfers. A typical software programming model would consist of initiating and waiting for DMA data requests on specific logical channels that are based on some sort of static mapping of the data to a channel. This results in operations on unrelated data that can potentially map to the same logical channel, resulting in false dependencies, which may in turn result in performance degradation.

Accordingly, there is a need for a system and method for controlling multiple DMA transfer requests to efficiently and quickly allocate DMA channels. There is also a need for a method and system for dynamically allocating logical channels for DMA transfers so as to reduce false dependencies. In addition, there is a need for a system and method to rapidly and efficiently reclaim deallocated DMA channels. Further limitations and disadvantages of conventional DMA allocation solutions will become apparent to one of skill in the art after reviewing the remainder of the present application with reference to the drawings and detailed description which follow.

SUMMARY OF THE INVENTION

A dynamic allocation system and methodology are provided for allocating logical channels for DMA transfers, where the logical channels for DMA transfers can be rapidly allocated, deallocated and reclaimed under software control, thereby reducing false dependencies for unrelated data transfers and improving performance. When an asynchronous DMA transfer is initiated, an available logical channel ID is automatically assigned and recorded based on an input value (e.g., an effective address). This input value can then be used to later wait on the outstanding request, using the same input value that was used to initiate it. With this method, all available logical channels can be utilized without any false-sharing. In a selected embodiment, a DMA transfer request associated with a given effective address is dynamically assigned a logical channel ID under control of software by identifying an available logical channel ID from a channel bitmap listing of channel IDs. Once an available channel ID is identified, the bitmap position corresponding to the identified channel ID is set, and a channel map is updated to associate the effective address with the identified channel ID.

In accordance with various embodiments, DMA channels may by dynamically allocated or assigned under software control using the methodologies and/or apparatuses described herein, which may be implemented in a data processing system with computer program code comprising computer executable instructions. In whatever form implemented, a request for a first DMA transfer is received during operation of a data processing system. In response, a first DMA channel identifier is allocated for use in performing the first DMA transfer by selecting the first DMA channel identifier that is available from a plurality of candidate DMA channel identifiers. To assist with waiting on the DMA transfer, the request for the first DMA transfer is mapped to the first DMA channel identifier, at which point the first DMA channel identifier is used to perform the first DMA transfer. The mapping may be implemented by maintaining a table for associating the first DMA channel identifier with a first memory address associated with the first DMA transfer, such as an application-defined tag or an effective address in external memory that is associated with the first DMA transfer. Once the first DMA transfer is completed, the first DMA channel identifier is deallocated. In selected embodiments, the allocation of the first DMA channel identifier is implemented by searching a channel bitmap to select and set an available DMA channel identifier. This may be done by identifying a first bit position corresponding to the first DMA channel identifier in the channel bitmap in which a predetermined value (e.g., a "zero") is stored, and then storing a second predetermined value (e.g., a "one") in the first bit position, thereby allocating the first DMA channel identifier to the first DMA transfer. In these embodiments, the first DMA channel identifier may be deallocated upon completion of the first DMA transfer by storing the first predetermined value (e.g., a "zero") in the first bit position upon completion of the first DMA transfer. In other embodiments where each of the plurality of candidate DMA channel identifiers comprises a virtual tag identifier, a first virtual tag identifier is allocated in response to receiving the request for the first DMA transfer. In this case, the request for the first DMA transfer is mapped to the virtual tag identifier by maintaining a table for associating the first virtual tag identifier with a first real tag identifier associated with the first DMA transfer.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and program are disclosed for dynamically allocating logical channel identifiers under software control using one or more multi-bit words as channel bitmaps, with each bit representing the availability of a DMA channel identifier. In a selected embodiment, each bit position represents a DMA channel identifier, where the bit being set represents that the channel is in-use, and the bit being re-set represents that the channel is available for allocation. When a DMA transfer is to be initiated, an available DMA channel identifier is selected by finding the first bit position that is not set, and then setting it. The DMA channel identifier designated by this bit position is then used for the data transfer. A mapping is then created between the input value associated with the DMA transfer request and the DMA channel identifier. When there is a request to wait for completion of the data transfer, the same input value is used with the mapping to wait on the appropriate logical channel. The input value used to create the mapping could be for example, an effective address or some application-generated identifier. For example, where the input value associated with a DMA request is a tag ID, the channel bitmap could be used to virtualize the tag ID into a different, dynamically assigned, unused tag ID. In other embodiments, tag IDs are dynamically assigned based on effect addresses to DMA operations initiated by a software-managed cache.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
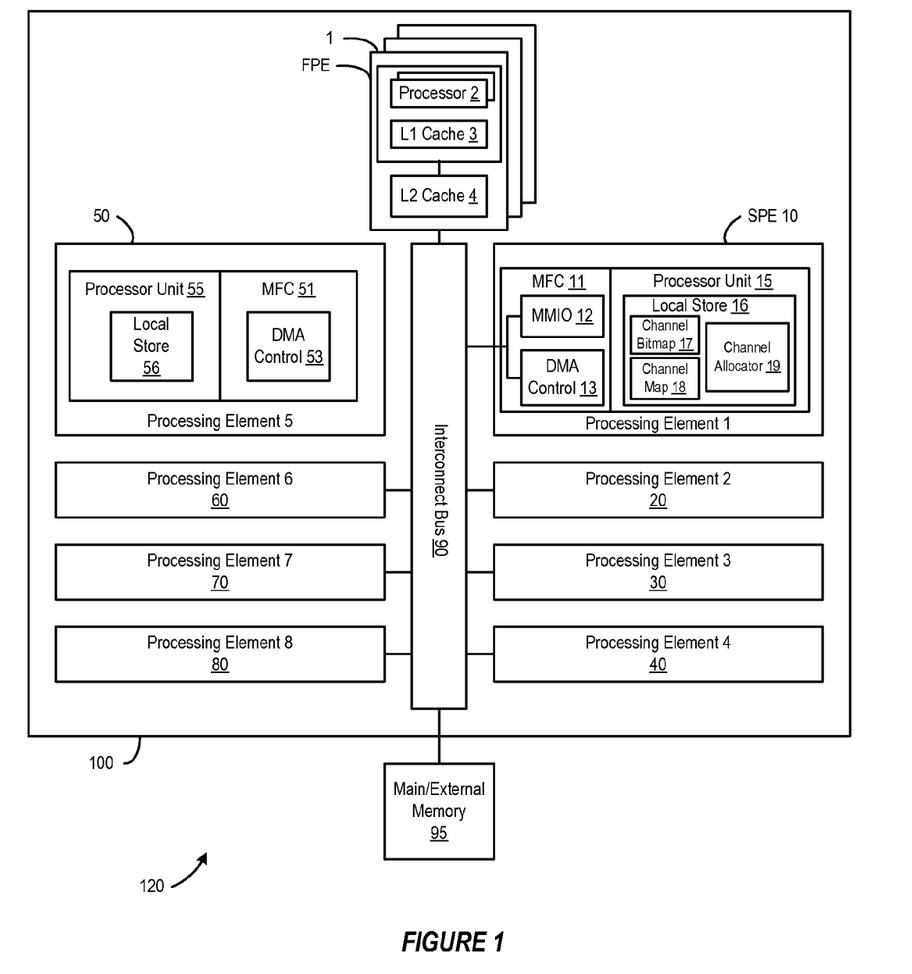
FIG. 1 illustrates a computer architecture that may be used within a data processing system in which the present invention may be implemented.

Referring to FIG. 1, a diagram depicts a computer architecture of a data processing system 120 in which selected embodiments of the present invention may be implemented. The depicted data processing system 120 contains one or more processing units (e.g., 1, 10, 20 . . . ), an external or main system memory 95, and a system or interconnect bus 90 that couples various system components, including the processing unit(s) and the system memory. In an example configuration, the data processing system 120 may be implemented as a high-performance system with multiple independent vector processors, such as IBM's Cell Broadband Engine (CBE) processor. As depicted, the CBE processor 120 employs nine cores integrated on a single chip multiprocessor 100, including eight attached processing units (APUs) 10, 20, 30, 40, 50, 60, 70, 80 and a power core 1 which acts as a controller to set up and maintain an environment for the APUs.

The power core 1, which is sometimes referred to as the power processor element (PPE), may be implemented with a traditional processor core, such as a 64-bit PowerPC architecture core for handling general-purpose computing chores using either 32-bit or 64-bit operating systems and applications. As depicted, the power core 1 includes one or more processor units 2 (such as an ALU and/or FPU), first level (L1) cache 3, a second level (L2) cache 4, and other logic and control circuitry for supporting simultaneous multithreading (SMT). In an example embodiment, the power core 1 contains a 64-bit, dual-thread PowerPC Architecture RISC core 2 and supports a PowerPC virtual-memory subsystem. In addition, 32K L1 instruction and data caches 3 and a 512K L2 unified (instruction and data) cache 4 may be provided on the power core 1 which is intended primarily for control processing, running operating systems, managing system resources, and managing APU threads.

Each of the APU cores, which are sometimes referred to as the synergistic processor elements (SPE), may be implemented as independent, high performance processor elements, each having a block of very high speed memory running their own individual application programs and threads. In selected embodiments, each APU (e.g., 10) contains a processor unit 15 (e.g., a RISC core), a software-controlled local store 16 for instructions and data, and a 128-bit, 128-entry unified register file (not shown). Each APU manages DMA transfers to and from the local store using a DMA controller module 13 in combination with channel allocation instructions 19 stored in the local store 16. In addition, each APU has full access to coherent shared memory 95, and performs DMA transfers to and from the memory 95 using the effective addresses of the memory-mapped I/O space. This is depicted in FIG. 1 with reference to an example first APU 10, which includes a first processor unit 15 which has full access to shared coherent memory 95 via the interconnect bus 90.

In operation of an example embodiment, each APU's processor unit (e.g., 15) can fetch instructions only from its own local store memory (e.g., 16), and load and store instructions executed by the APU 10 can only access the local store 16 using local store addresses (not main memory effective addresses). To this end, each APU core (e.g., 10) controls DMA transfers and communicates with the remainder of the data processing system 120 by means of channels that are implemented in and managed by the APU memory flow controller (MFC) (e.g., 11). Channels are unidirectional interfaces for sending and receiving variable-size (e.g., up to 32-bit) messages with other system components, and for sending commands (such as direct memory access transfer commands) to the APU'S associated memory flow controller (MFC). Each APU has its own set of channels. The MFC 11 serves as the APU'S interface, by means of the element interconnect bus (EIB) 90, to the external main memory 95 and to other processor elements and system devices. The primary role of the MFC 11 is to interface between the local store memory and external main memory by means of a DMA controller 13 that moves instructions and data between a local store address and an effective address in main memory 95.

Each APU accesses its corresponding MFC 11 state information using a channel interface (not shown). The power core 1 and other devices in the system 120, including other APU cores, can also access the MFC 11 state through memory-mapped I/O (MMIO) registers and queues 12 in the MFC 11, which are visible to software in the main-storage address space. With this configuration, data transfers between an APU's local store (e.g., 16) and main memory 95 are performed using the APU's DMA controller 13 in the MFC 11 associated with the local store 16. Each DMA command may be tagged with a tag ID that allows software to check or wait on the completion of the DMA command. Channel allocation software 19 running on the associated APU uses a channel bitmap 17 and mapping structure 18 to dynamically assign logical DMA channel identifiers, as described more fully hereinbelow.

With multi-core embodiments of the data processing system 120, processing power is increased by adding more APU cores. Even so, the full processing power of such multiprocessor embodiments is not readily realized because memory latency as measured in processor cycles has gone up dramatically due to improvements in processor designs. To improve processing speed, each APU core (e.g., 10) is provided with a small (e.g., 256K) high performance local memory 16, while slower-speed access to a larger (e.g., multi-gigabyte) dynamic random access memory (DRAM) 95 is also provided. In selected embodiments, each APU (e.g., 10) is optimized for running computationally-intensive SIMD applications, and depends on the power core 1 to run the operating system, and, in many cases, the top-level thread control for an application. In turn, the power core 1 uses the APUs to provide the bulk of the application performance.

System memory 95 may be implemented with computer storage media in the form of non-volatile memory and/or volatile memory in the form of a collection of dynamic random access memory (DRAM) modules that store data and instructions that are immediately accessible to and/or presently operated on by the processing unit(s) 1, 10, 20, etc. System memory may also have an associated memory controller (not shown) for controlling access to and from system memory 95.

The depicted interconnect bus 90 may be implemented as a memory-coherent element interconnect bus (EIB) which connects the APUs together and the L2 cache 4 on the power core 1 using a plurality of multi-byte data rings. It will be appreciated that any desired bus architecture can be used. Though not shown, a communication adapter may be used to provide access to communication link(s), a user interface adapter(s) connected to various user input/output devices (such as a keyboard, mouse, touch screen, stylus, microphone, storage, printer, display, etc.).

To an application programmer, the data processing system 120 looks like a 9-way coherent multiprocessor in which the power core 1 is designed to efficiently handle and switch between control-intensive tasks, while the APU cores 10, 20, etc. are designed to efficiently handle computationally intensive tasks, albeit at a slower switching rate. Based in part on the different specializations of the cores, the power and APU cores may use different memory access techniques. In support of the power core's control functionality, the power core 1 may access the main memory 95 by using the effective-address space to execute load and store instructions to move data between main memory 95 and a private register file (e.g., in the processor unit 2 of the power core 1), the contents of which may be cached (e.g., in L1 cache 3 or L2 cache 4). In contrast, the APU cores (e.g., 10, 50) may access the main memory 95 with direct memory access (DMA) commands that move data and instructions between the main memory 95 and a local memory store or local storage (e.g., 16, 56). Because an APU core's instruction-fetches and load and store instructions access only its local store rather than shared main storage, and the local store has no associated cache. The result is a 3-level organization of storage (register file, local store, main memory), with asynchronous DMA transfers between local store and main memory which explicitly parallelizes computation with the transfers of data and instructions that feed computation and store the results of computation in main memory.

Even with a local store cache memory (e.g., 16) at each APU core (e.g., 10), the performance of an APU core is still limited by memory latency. For example, when a sequential program on a conventional architecture performs a load instruction that misses in the caches, program execution comes to a halt for several hundred cycles. Compared to this penalty, the few cycles it takes to set up a DMA transfer for an APU core are a much better trade-off, especially considering the fact that each of the DMA controllers on the eight APU cores can have up to 16 DMA transfers in flight simultaneously. While hardware DMA controllers can be used to allow multiple DMA transfer requests on different logical channels, such special-purpose hardware has a number of drawbacks, including slowing down processing, increasing power consumption, and reducing the number of APU cores that could be place on a single die. With a software DMA control scheme, memory latency can be hidden by an APU core whenever a programmer initiates a DMA transfer by having the APU core perform work by executing other code, and then having the programmer wait on the transfer to complete. In this way, memory latency is hidden by doing work instead of waiting.

Thus, instead of using a conventional memory management schemes, the local store memory block (e.g., local store 16) in each APU may be implemented as a small (e.g., 256K), software-managed cache which stores data that is pulled directly from the main memory 95 under control of a DMA controller (e.g., 13) which assigns DMA channels as a resource that can be scheduled in software. By providing each APU (e.g., 10) with a DMA controller (e.g., 13), the programmer is able to issue requests for memory out of main memory 95 by using the DMA controller to pull the memory directly into the local store or cache 16 using explicit DMA commands. With a fixed number channels that can have concurrent DMA requests pending, the programmer uses explicit DMA commands to request that a memory transfer begin, and can then still do work on something else while that memory is being brought into the local store cache 16. To this end, the programmer issues a command to wait on the channel to ensure that the transfer is complete.

Since each APU core (e.g., 10) has its own DMA controller (e.g., 13), each APU core will manage its own channel assignment and have its own channel allocator. The allocator may be provided as a library or API that the programmer would use to issue DMA requests. The library would maintain its own internal data structures (such as the channel bitmap) which are stored in the local store memory 16. In addition, the allocator would maintain a mapping between effective addresses and channel identifiers. As a result, the programmer only needs to pass the effective address and a destination address to the library or API 13 when submitting a DMA transfer request, and is not required to supervise or manage the specifics of the DMA operation. Effectively, the DMA channel assignment responsibility is transferred from the programmer to the library or API in each APU core.

In an example implementation, each APU core performs DMA transfers by supporting a list, such as a scatter-gather list, of DMA transfers that is constructed and stored in the APU core's local store memory. In accordance with selected embodiments of the present invention, the list is constructed by using a channel bitmap to select an available logical channel which is then mapped to the DMA transfer request using a channel map data structure. With such a list, the DMA transfers can be set up and controlled by a first APU core 10 that is sourcing or receiving the data, or by the power core 1, or by another APU core (e.g., 50). The list also allows the APU core's DMA controller to process the list asynchronously while the APU core operates on previously transferred data.

In an example embodiment, program instructions or code for dynamically assigning DMA logical channels may execute on an APU core with or without a power core counterpart, or may be part of a larger program that could contain multiple APU programs or a power core program. To the extent that each APU core uses its own DMA controller to manage the DMA channel assignment and allocation, this DMA controller may be implemented with software or other code that is tangibly embodied in a computer-readable medium (e.g., local storage device 16) or any other fixed or removable data storage devices. Further, the DMA controller (e.g., 13) may comprise instructions which, when read and executed by the processor unit 15, cause the APU core 10 to perform the steps necessary to implement and/or use the present invention. As such, the terms "article of manufacture," "program storage device" and "computer program product" as may be used herein are intended to encompass a computer program accessible and/or operable from any computer readable device or media.

Each of the eight APU cores 10, 20, 30, 40, 50, 60, 70, 80 may be implemented as a single instruction/multiple data (SIMD) vector processor (which may be generically referenced as a vector processor) which employs an independent instruction stream. In this configuration, each vector processor includes instructions capable of processing multiple data items in parallel. For example, such a vector processing architecture may multiply corresponding 32-bit floating-point quantities in a 128-bit word in parallel. As depicted in FIG. 1, each of the vector processors 10-80 is operatively coupled to its own a high-speed local store memory or cache memory (e.g., 16), which may be generically referenced as a local store cache memory. In turn, the local store cache memory of each vector processor 10-80 is operatively coupled to a larger main memory 95. However, it is important to note that embodiments of the invention are not limited to any specific number of vector processors. In addition, embodiments of the invention are not limited to any particular cache level and the local store cache memory may reside in the vector processor or be a separate component.

In the vector processor embodiment described herein, a memory access occurs whenever data is read or written to any memory device. In the embodiments where each vector processor is capable of directly accessing only its own local store memory (e.g. 256K RAM), the vector processors use direct memory access (DMA) techniques to copy between main memory 95 and their respective local store memory. Management of the data between the local store cache memory (e.g., 16) and the main memory 95 is facilitated by using any desired cache management technique, such as a cache metadata array having virtual tags and physical addresses of the main memory 95 and local store cache memory (e.g., 16), respectively.

When a vector processor initiates a DMA transfer, the DMA controller assigns each transfer to a logical channel which is identified by a logical channel ID. In IBM's Cell processor, the logical channels are represented by tags, and in this sense, the terms "tag" and "channel" may be used interchangeably. By using a channel map as described herein, each tag may be mapped to a channel ID. If there were no limit on the number of DMA transfer channels, then concurrent DMA transfer requests would never need to share a logical channel. However, in situations where there a finite number of channels, unrelated DMA requests occasionally may be forced to share a channel. In situations where a DMA channel is shared, a program may have to wait for data to transfer that it does not care about because another request was made on the same DMA channel.

Figure 2:
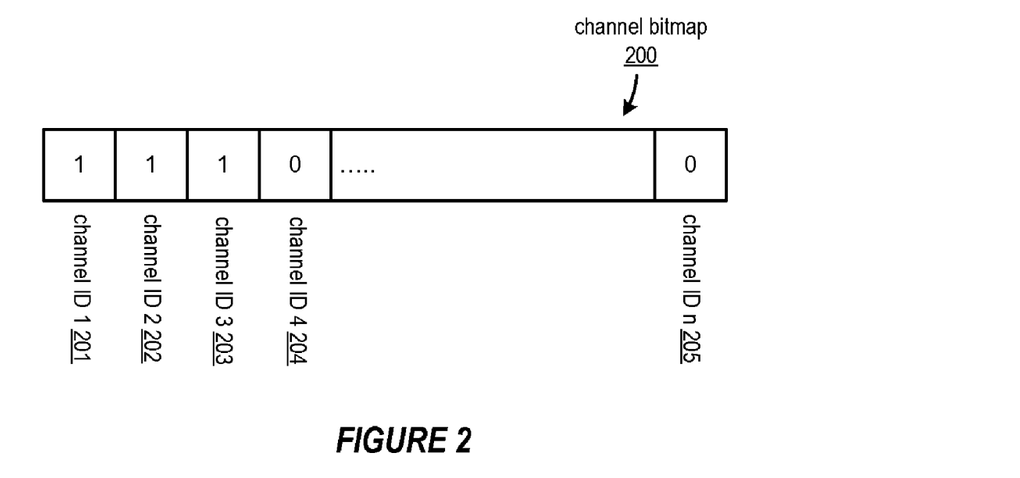
FIG. 2 illustrates an example channel bitmap which is used to dynamically allocate logical channels to DMA transfer requests.

Instances of shared DMA channels may be reduced by intelligently allocating channels at the time the DMA request is made. In an example embodiment, a bitfield method may be used to allocate channels by maintaining a channel bitmap, where each bit position in the channel bitmap represents a logical channel, and the value of the bit indicates whether the logical channel is available (e.g., the bit is set to a "zero" value) or allocated (e.g., the bit is set to a "one" value). An example of such a channel bitmap is depicted in FIG. 2 which illustrates an example channel bitmap 200 that is used to dynamically allocate logical channels to DMA transfer requests. The channel bitmap may be formed as one or more n-bit words (e.g., a 32-bit word), where each bit represents the availability of a DMA channel identifier. Thus, a first logical channel 1 is represented by the first bit position 201, a second channel ID 2 is represented by the second bit position 202, a third channel ID 3 is represented by the third bit position 3, a fourth channel ID 4 is represented by the fourth bit position 204, and so on until the nth channel ID is represented by the last bit position 205. As shown in FIG. 2, if the bit for a given channel ID is set (e.g., a "one" is stored for the first channel ID 1), this represents that the channel is in-use. Alternatively, if the bit for a given channel ID is reset (e.g., a "zero" is stored for the fourth channel ID 4), this represents that the channel is available for allocation. The bitfield method uses the channel bitmap to dynamically allocate DMA channels whenever a DMA transfer is initiated by finding the first bit position in the channel bitmap that is not set and then setting it, thereby selecting an available DMA channel identifier for the DMA transfer. The DMA channel identifier designated by this bit position is then used for the DMA transfer, and a mapping is then created between the input value associated with the DMA transfer request and the DMA channel identifier.

Figure 3:
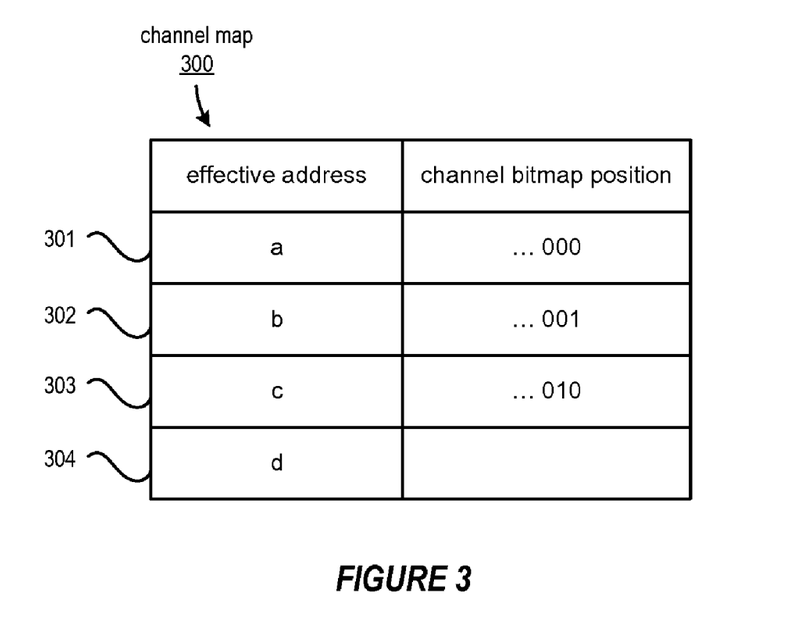
FIG. 3 illustrates an example channel map which is used to associate allocated logical channels with their corresponding DMA transfer requests.

An example of such a mapping is depicted in FIG. 3 which illustrates an example channel map 300 which is used to associate allocated logical channels with their corresponding DMA transfer requests. In the depicted channel map 300, a simple table is maintained in which each row (e.g., row 301) associates a DMA transfer with its allocated channel bitmap position in the channel bitmap (e.g., 200). As depicted, a first row 301 associates an input value for a first DMA transfer (e.g., the main memory effective address "a" for the first DMA transfer) with the channel bitmap position 201 in the channel bitmap 200 corresponding to the logical channel identifier (e.g., channel ID 1) that was allocated for the first DMA transfer. For example, if the channel bitmap 200 is a 32-bit word and the channel ID 1 corresponding to bitmap position 201 was allocated to the first DMA transfer, then the channel bitmap position for channel ID 1 201 stored in the map row 301 would be "00000." Likewise, if the channel bitmap 200 was used to allocate channel ID 2 to a second DMA transfer, then the second row 302 in the map 300 associates an input value for the second DMA transfer (e.g., the main memory effective address "b" for the second DMA transfer) with the channel bitmap position 202 in the channel bitmap 200 corresponding to channel ID 2 (e.g., bitmap position "00001"). In similar fashion, if the channel bitmap 200 was used to allocate channel ID 3 to a third DMA transfer, then the third row 303 in the map 300 associates an input value for the third DMA transfer (e.g., the main memory effective address "c" for the third DMA transfer) with the channel bitmap position 203 in the channel bitmap 200 corresponding to channel ID 3 (e.g., bitmap position "00010").

For a new DMA transfer request (e.g., a fourth DMA transfer associated with main memory effective address "d"), the channel bitmap 200 is searched to find the first free or unallocated logical channel identifier. In the example of FIG. 2, the first available channel identifier would be the fourth channel ID 204, since its value is reset or "zero." Upon setting the value of the fourth bit position 204 in the channel bitmap 200 to a "one" (not shown), the map 300 would be updated so that the fourth row 304 associates an input value for the new DMA transfer (e.g., the main memory effective address "d" for the fourth DMA transfer) with the channel bitmap position 204 in the channel bitmap 200 corresponding to channel ID 4 (e.g., bitmap position "00011").

Figure 4:
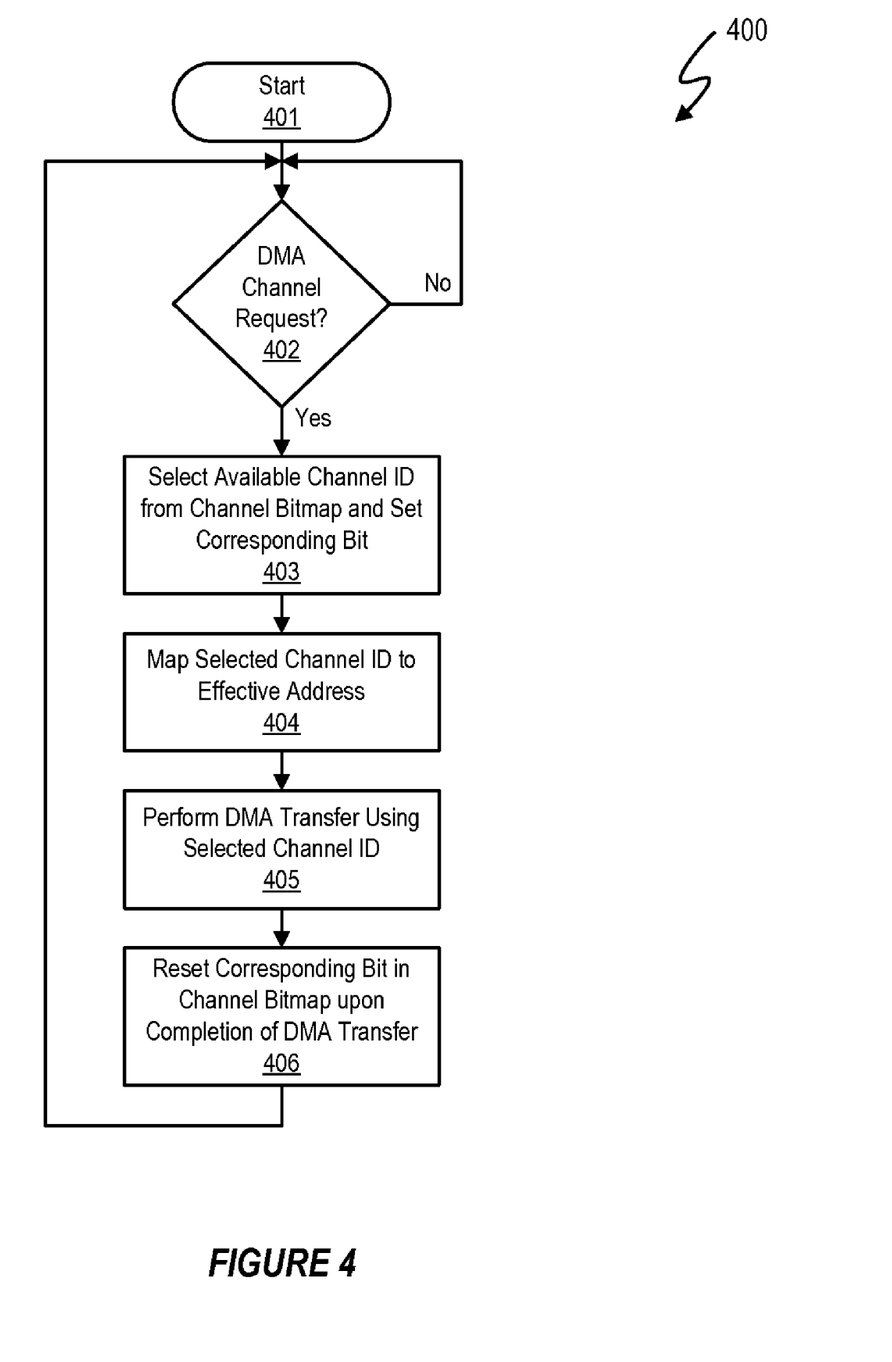
FIG. 4 is a logical flowchart of the steps used to allocate and deallocate DMA channels to individual DMA requests.

To further illustrate selected embodiments of the present invention, FIG. 4 depicts a logical flowchart 400 of the steps used to allocate and deallocate DMA channels to individual DMA requests. At step 401, the process starts, such as when an APU core is running a program that requires data from memory. When a memory access is required, a DMA transfer is initiated by requesting a DMA channel identifier for the transfer (affirmative outcome to decision 402). A DMA channel identifier is provided by using the channel bitmap to select and set an available (e.g., non-allocated) channel identifier (step 403). This may be done by selecting a channel identifier corresponding to a bit position in the channel bitmap in which a "zero" is stored, and then setting the corresponding bit to "one."

Once a channel ID is selected and set, the channel ID is then mapped to an input value associated with the DMA transfer request (step 404). The input value used to create the mapping could be for example, an effective address or some application-generated identifier. For example, where a DMA transfer request contains both a local store address and a main memory effective address, the channel ID may be mapped to the main memory effective address, such as by using a channel map 300 shown in FIG. 3. Alternatively, the input value associated with a DMA request may be the tag ID, in which case the channel bitmap could be used to virtualize the tag ID into a different, dynamically assigned, unused tag ID. In other embodiments, tag IDs are dynamically assigned based on effect addresses to DMA operations initiated by a software-managed cache. Whatever allocation technique is used, the allocated channel ID is used to perform the DMA transfer (step 405). In this way, the mapping scheme of the present invention may be used, given the same input value, when there is a request to wait for completion of the data transfer, to wait on the appropriate logical channel. Once the DMA transfer is completed, the channel ID is no longer needed and may be deallocated by resetting the bit in the channel bitmap that corresponds to the channel ID (step 406). The deallocated channel ID is then available for use by a subsequent DMA transfer, as indicated by the loopback path to the DMA channel request detection step 402.

As will be appreciated, other techniques may be used to dynamically allocate channels while still obtaining selected benefits of the present invention. For example, DMA channel identifiers can be allocated by virtualizing the tags to provide the user/program with more tags than there are available hardware channels. By maintaining a mapping between virtual tag IDs and real tag IDs (instead of effective addresses and tag/channel IDs), DMA requests could be scheduled to provide improved performance and/or to allow the user/program to allocate DMA requests.

By using channel bitmaps, DMA requests may be allocated dynamically, accurately and efficiently in a way that avoids the delay associated with other allocation techniques which require additional processing cycles or time to control how the DMA requests are allocated. Channel bitmap allocation techniques also allow logical channels to be dynamically allocated for DMA transfers so as to reduce false dependencies, and also enable deallocated DMA channels to be rapidly and efficiently reclaimed.

As will be appreciated by one skilled in the art, the present invention may be embodied in whole or in part as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. For example, the functions of dynamic DMA channel allocation module may be implemented in software that is stored in the local store or in a separate memory storage unit, and may be executed by a DMA controller, regardless of its location in the APU core.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for allocating DMA channel identifiers in a data processing system, comprising:

receiving a request for a first DMA transfer during operation of said data processing system;

allocating a first DMA channel identifier for use in performing the first DMA transfer by searching a channel bitmap to select and set a bit position in the channel bitmap corresponding to the first DMA channel identifier that is available from a plurality of candidate DMA channel identifiers in response to receiving said request for the first DMA transfer, where each bit position in the channel bitmap represents a logical channel and has a value to indicate whether the logical channel is available or allocated;

mapping the request for the first DMA transfer to the first DMA channel identifier;

using the first DMA channel identifier to perform the first DMA transfer; and deallocating the first DMA channel identifier upon completion of the first DMA transfer.

2. The method of claim 1, where deallocating the first DMA channel identifier comprises resetting the bit position in the channel bitmap corresponding to the first DMA channel identifier upon completion of the first DMA transfer.

3. The method of claim 2, where searching the channel bitmap to select and set the available DMA channel identifier comprises:

identifying a first bit position in the channel bitmap in which a predetermined value is stored, where the first bit position corresponds to the first DMA channel identifier; and storing a second predetermined value in the first bit position, thereby allocating the first DMA channel identifier to the first DMA transfer.

4. The method of claim 3, where deallocating the first DMA channel identifier upon completion of the first DMA transfer comprises storing the first predetermined value in the first bit position upon completion of the first DMA transfer, thereby deallocating the first DMA channel identifier.

5. The method of claim 1, where searching a channel bitmap to select the first DMA channel identifier comprises searching one or more multi-bit words where each bit position represents an availability status for a channel ID.

6. The method of claim 1, where mapping the request for the first DMA transfer to the first DMA channel identifier comprises maintaining a table for associating the first DMA channel identifier with a first memory address associated with the first DMA transfer.

7. The method of claim 6, where the first memory address is an effective address in external memory that is associated with the first DMA transfer.

8. The method of claim 6, where the first memory address is an application-defined tag that is associated with the first DMA transfer.

9. The method of claim 1, where each of the plurality of candidate DMA channel identifiers comprises a virtual tag identifier so that a first virtual tag identifier is allocated in response to receiving the request for the first DMA transfer, and where mapping the request for the first DMA transfer comprises maintaining a table for associating the first virtual tag identifier with a first real tag identifier associated with the first DMA transfer.

10. A computer-usable storage medium embodying computer program code, the computer program code comprising computer executable instructions configured for dynamically allocating DMA channel identifiers in a data processing system by:
receiving a request for a first DMA transfer during operation of said data processing system;
allocating a first DMA channel identifier for use in performing the first DMA transfer by searching a channel bitmap to select and set a bit position in the channel bitmap corresponding to the first DMA channel identifier that is available from a plurality of candidate DMA channel identifiers in response to receiving said request for the first DMA transfer, where each bit position in the channel bitmap represents a logical channel and has a value to indicate whether the logical channel is available or allocated;
mapping the request for the first DMA transfer to the first DMA channel identifier;
using the first DMA channel identifier to perform the first DMA transfer; and
deallocating the first DMA channel identifier upon completion of the first DMA transfer.

11. The computer-usable storage medium of claim 10, where deallocating the first DMA channel identifier comprises resetting the bit position in the channel bitmap corresponding to the first DMA channel identifier upon completion of the first DMA transfer.

12. The computer-usable storage medium of claim 11, where searching the channel bitmap to select and set an available DMA channel identifier comprises:
identifying a first bit position in the channel bitmap in which a predetermined value is stored, where the first bit position corresponds to the first DMA channel identifier; and
storing a second predetermined value in the first bit position, thereby allocating the first DMA channel identifier to the first DMA transfer.

13. The computer-usable storage medium of claim 12, where deallocating the first DMA channel identifier upon completion of the first DMA transfer comprises storing the first predetermined value in the first bit position upon completion of the first DMA transfer, thereby deallocating the first DMA channel identifier.

14. The computer-usable storage medium of claim 10, where searching a channel bitmap to select the first DMA channel identifier comprises searching one or more multi-bit words where each bit position represents an availability status for a channel ID.

15. The computer-usable storage medium of claim 10, where mapping the request for the first DMA transfer to the first DMA channel identifier comprises maintaining a table for associating the first DMA channel identifier with a first memory address associated with the first DMA transfer.

16. The computer-usable storage medium of claim 15, where the first memory address is an effective address in external memory that is associated with the first DMA transfer.

17. The computer-usable storage medium of claim 15, where the first memory address is an application-defined tag that is associated with the first DMA transfer.

18. The computer-usable storage medium of claim 10, where each of the plurality of candidate DMA channel identifiers comprises a virtual tag identifier so that a first virtual tag identifier is allocated in response to receiving the request for the first DMA transfer, and where mapping the request for the first DMA transfer comprises maintaining a table for associating the first virtual tag identifier with a first real tag identifier associated with the first DMA transfer.

19. A data processing system comprising:
a processor;
a DMA controller coupled to the processor;
a local store memory coupled to the processor and to the DMA controller, said local store memory embodying computer program code for use by the DMA controller in performing DMA transfers to and from the local store memory, the computer program code comprising instructions executable by the DMA controller and configured for allocating DMA channel identifiers in the data processing system by:
receiving a request for a first DMA transfer during operation of said data processing system;
allocating a first DMA channel identifier for use in performing the first DMA transfer by searching a channel bitmap to select and set a bit position in the channel bitmap corresponding to the first DMA channel identifier that is available from a plurality of candidate DMA channel identifiers in response to receiving said request for the first DMA transfer, where each bit position in the channel bitmap represents a logical channel and has a value to indicate whether the logical channel is available or allocated;

mapping the request for the first DMA transfer to the first DMA channel identifier;

using the first DMA channel identifier to perform the first DMA transfer; and deallocating the first DMA channel identifier upon completion of the first DMA transfer.

20. The data processing system of claim 19, where allocating the first DMA channel identifier comprises searching the channel bitmap to select and set an available DMA channel identifier by:

identifying a first bit position in the channel bitmap in which a predetermined value is stored, where the first bit position corresponds to the first DMA channel identifier; and storing a second predetermined value in the first bit position, thereby allocating the first DMA channel identifier to the first DMA transfer.

* * * * *